United States Patent

Arai et al.

[11] Patent Number: 5,695,893
[45] Date of Patent: Dec. 9, 1997

[54] MATERIAL FOR USE IN THE POSITIVE ELECTRODES OF LITHIUM BATTERIES, ITS MANUFACTURE, AND LITHIUM BATTERIES INCORPORATING THIS MATERIAL

[75] Inventors: Hajime Arai; Shigeto Okada; Yoji Sakurai; Jun-ichi Yamaki, all of Mito, Japan

[73] Assignee: Nippon Telegraph and Telephone Corporation, Tokyo, Japan

[21] Appl. No.: 642,857

[22] Filed: May 6, 1996

[30] Foreign Application Priority Data

May 18, 1995 [JP] Japan ................................. 7-143905

[51] Int. Cl.[6] ........................................................ H07M 4/52
[52] U.S. Cl. ............................ 429/221; 423/551; 423/558
[58] Field of Search ............................ 423/551, 558; 429/221

[56] References Cited

U.S. PATENT DOCUMENTS 4,132,547  1/1979  Buzzelli et al. ............... 429/221 X
5,415,957  5/1995  Okada et al. ...................... 429/194

FOREIGN PATENT DOCUMENTS 0 592 301A1   4/1994   European Pat. Off. .
07302618     11/1995   Japan .
07312217     11/1995   Japan .

OTHER PUBLICATIONS

A. Manthiram et al., "Lithium Insertion Into $Fe_2(SO_4)_3$ Frameworks," J. of Power Sources, vol. 26, Nos. 3/4, (May 16, 1989), pp. 403–408.

S. Okada et al., "Characteristics of New Low–Cost High–Voltage Cathode, $Fe_2(SO_4)_3$," Extended Abstracts, vol. 93, (May, 1993), pp. 130–131.

Proceedings of the Symposium on New Sealed Rechargeable Batteries and Supercapacitors, vol. 93–23, pp. 431–442 (title page only –date not indicated)

T. Nagaura, "Development of Rechargeable Lithium Batteries," JEC Battery Newsletter No. 2 (Mar.–Apr. 1991), pp. 17–25.

S. Okada et al., "Characteristics of New Low–cost High–voltage Cathode, $Fe_2(SO_4)_3$," Extended Abstracts, vol. 93–1, May 16–21, 1993, pp. 130–131.

H. Ohtsuka, "$Fe_2(SO_4)_3$ as a Cathode Material for Rechargeable Lithium Batteries," Proceedings of the 36th Power Sources Conference, Jun. 6–9, 1994, pp. 110–113.

S. Okada et al., "Cathode Properties of Nasicon type $Fe_2(SO_4)_3$ for Li Secondary Batteries," The 35th Battery Symposium in Japan, Nov. 14–16, 1994, pp. 177–178 (with English–language abstract).

N. Shinbunsya et al., "Oxide of Li Ion Secondary Battery Positive Electrode Material and Separator Present State and Development," ITE Special Battery Seminar 2, Mar. 16, 1996 with English–language abstract).

Primary Examiner—Stephen Kalafut
Attorney, Agent, or Firm—Finnegan, Henderson, Farabow, Garrett & Dunner, L.L.P.

[57] ABSTRACT

A positive electrode material for use in lithium batteries contains a compound represented by the chemical formula $Li_xFe_2(SO_4)_3$ ($0<x\leq2$). This positive electrode material is made from low cost material which is available in abundant quantities. Moreover a lithium battery using this material has a large discharge energy and long cycle life.

10 Claims, 2 Drawing Sheets

MATERIAL FOR USE IN THE POSITIVE ELECTRODES OF LITHIUM BATTERIES, ITS MANUFACTURE, AND LITHIUM BATTERIES INCORPORATING THIS MATERIAL

BACKGROUND OF THE INVENTION

1. Field of the Invention

This invention relates to lithium batteries, the material used as the positive electrodes in those batteries, and the manufacture of that material, and in particular relates to rechargeable secondary lithium batteries.

2. Background Art

Recently, with the increased awareness of environmental problems, the development of electric automobiles as replacements for internal combustion engine based vehicles using petrol, has been given considerable urgency. Furthermore, demand for batteries for use in the various portable electronic appliances such as portable telephones is also increasing. This situation has generated a need for improvements in the performance of secondary batteries, which can be reused following recharging. Of specific interest are batteries which can be miniaturized, have a high energy density, and which display a long cycle life.

Anhydrous electrolyte batteries containing negative electrodes composed of alkali metals such as lithium or their compounds, are an example of known batteries which meet these criteria. In these types of secondary batteries, metallic ions from the negative electrode react with the positive electrode via insertion or intercalation, thus the batteries are able to achieve a compatibility between high discharge capacity and charge/discharge reversibility.

In the past, the positive electrode material consisted of some type of sulfide compound, such as titanium disulfide.

However, the voltage of batteries employing sulfide compounds as the positive electrode material was, at approximately 2 volts, low, and so the batteries suffered from problems of low discharge energy. With such a low discharge voltage, use of these batteries in LSIs with drives rated at 3 or 3.3 volts required multiple batteries, which was inconvenient.

Subsequently, a high discharge voltage battery has been proposed and developed, containing $LiCoO_2$ as the positive electrode and with a discharge voltage in the 4 volt range.

Furthermore, batteries which employ an active material retainer which is capable of lithium insertion and extraction have also been proposed (lithium ion battery, rocking chair battery). The lithium ion battery is first constructed of an active material retainer with no lithium inserted, as the negative electrode, and a material such as $LiCoO_2$, which has been previously lithiated, as the positive electrode. Then by provision of a potential difference across the two electrodes, causing lithium to move from the positive electrode and be inserted in the negative electrode, high voltage battery is produced and functions. The negative electrode acts as a low potential negative electrode by being supplied with lithium from the positive electrode, and through the reaction. These lithium ion batteries are excellent batteries in that they have high energy densities, and display a particularly long cycle life.

However, as cobalt is expensive and exists in only small quantities in natural materials, and as there is no guarantee of a stable supply, positive electrode material employing $LiCoO_2$ is extremely expensive, and thus unsuitable for large scale use. In particular, in those instances where large batteries are needed in order to guarantee a large capacity, a significant amount of positive electrode material is required, making $LiCoO_2$ unsuitable.

Consequently, the future use of $LiCoO_2$ as the positive electrode of lithium batteries, the demand for which appears to set to increase, is hampered by problems of cost and resource. Furthermore, the synthesis of $LiCoO_2$ requires very high temperatures of 850°–900° C., further increasing the cost of production.

In addition to $LiCoO_2$, the compounds $LiNiO_2$ and $LiMn_2O_4$ also allow production of high energy density rechargeable batteries with voltages in excess of 3 volts, but these compounds are also either expensive or difficult to resource in sufficient amount.

As a result of research into battery positive electrode materials which are cheap but still display high energy density, $Fe_2(SO_4)_3$ was selected. As $Fe_2(SO_4)_3$ is an iron based material, it is cheap and readily available in abundant quantities. Furthermore, its synthesis is also simple. A battery constructed with $Fe_2(SO_4)_3$ as the positive electrode and lithium metal as the negative electrode has a high energy density and generates a discharge curve which is almost level at 3.6 volts.

However, batteries made using unlithiated $Fe_2(SO_4)_3$ as the positive electrode material, differ from batteries which employ $LiCoO_2$ as the positive electrode, in that there is no supply of lithium from the positive electrode, and so the lithium used in the charging and discharging exists only in the negative electrode. Consequently, the total amount of lithium in the battery is small, which creates the problem that the consumption of this lithium is relatively fast, resulting in a shortened cycle life.

Furthermore, as the use of $Fe_2(SO_4)_3$ as the positive electrode material results in no supply of lithium to the negative electrode, the use of an active material retainer, which is capable of lithium insertion and extraction and in which extraction capable lithium has not previously been retained, as the negative electrode is not suitable. Hence the use of such a negative electrode for a good performing lithium ion battery is impossible.

In order to solve these problems, the lithiation of the negative electrode active material retainer could be considered, but the lithiated active material retainer is then extremely unstable under normal atmospheric conditions and very difficult to handle, meaning that the actual production of a lithium ion battery employing a lithium inserted active material retainer for negative electrode is not practical.

SUMMARY OF THE INVENTION

The present invention has been developed in view of the abovementioned problems, with the object of providing; a lithium battery which has a lithium positive electrode, displays excellent energy density and long cycle life properties, and yet is cheap and thus suitable for large scale use; the material for use in this positive electrode; and a production method for that material.

The positive electrode material for use in lithium batteries according to the present invention is characterized in containing a compound represented by the chemical formula $Li_xFe_2(SO_4)_3$ ($0<x\leq2$).

The method of producing a positive electrode material for use in lithium batteries according to the present invention is characterized by chemically reacting lithium metal or a lithium compound, and $Fe_2(SO_4)_3$, or a precursor which gives rise to $Fe_2(SO_4)_3$, to produce a compound represented by the chemical formula $Li_xFe_2(SO_4)_3$ ($0<x\leq2$).

The lithium battery according to the present invention comprises a positive electrode, a negative electrode and electrolyte, and is characterized in that the material of the positive electrode comprises a compound represented by the chemical formula $Li_xFe_2(SO_4)_3$ ($0<x\leq2$).

The present invention is able to provide a battery which is low cost, uses material which is available in abundant quantities, and in which the discharge voltage is high and the cycle life long, and has the advantage of therefore being utilizable in a wide range of applications, including as a power source for electric cars and various portable electronic equipment.

Furthermore, as high temperatures are not required in the synthesis of the positive electrode material, not only is the cost of the starting materials low, but the cost of production can also be reduced.

Moreover, in the synthesis of the positive electrode material, if a lithium compound is used which has a redox potential relative to a lithium electrode of between 1.5 and 3.6 volts, then even if an excess of the lithium compound is added to the reaction mixture, the value of x in $Li_xFe_2(SO_4)_3$ will not exceed 2, meaning the synthesis is simple and the reaction time short.

Furthermore, since active material retaining bodies which are capable of lithium insertion and extraction, are suitable for use as the negative electrode in batteries of the present invention, batteries with a particularly long cycle life are obtainable.

DESCRIPTION OF THE PREFERRED EMBODIMENTS

The positive electrode material of lithium batteries of the present invention is characterized in containing the compound represented by the chemical formula $Li_xFe_2(SO_4)_3$ ($0<x\leq2$). Because this $Li_xFe_2(SO_4)_3$ is an iron based material, it is cheap and abundant, unlike expensive metals such as cobalt. Consequently, positive electrode material containing $Li_xFe_2(SO_4)_3$ can be produced very cheaply when compared with positive electrode material containing $LiCoO_2$. Furthermore, as the production method employs mainly low temperature operations, production costs can also be reduced.

Moreover, by using $Li_xFe_2(SO_4)_3$, batteries with high energy densities and a high voltage of approximately 3.6 volts are obtained.

Furthermore, because this material contains lithium, batteries incorporating positive electrodes containing this material are able to supply lithium from the positive to the negative electrode. Consequently, the total amount of lithium which exists in the battery is large, resulting in a longer cycle life. Moreover, as it is also suitable for use as the positive electrode in lithium ion batteries, where the negative electrode consists of a lithium insertion and extraction capable active material retainer, batteries with particularly long cycle life can be obtained.

Figure 2:
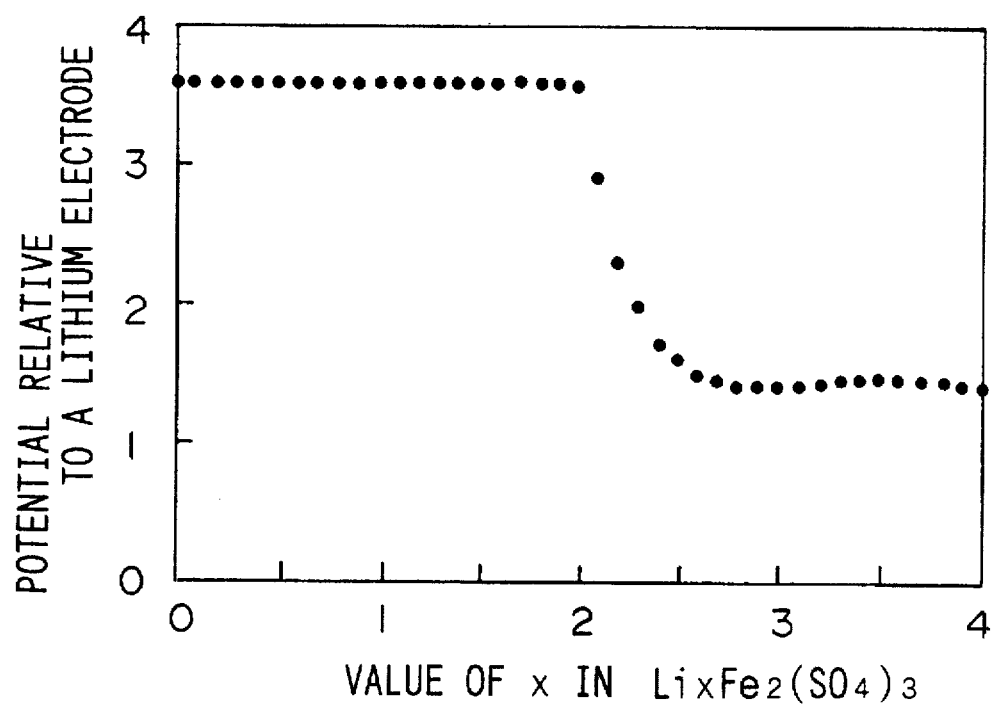
FIG. 2 is a graph showing the relationship between the x value in $Li_xFe_2(SO_4)_3$ and the potential relative to a lithium electrode.

It is necessary that the value of x in $Li_xFe_2(SO_4)_3$ be kept to a value of 2 or less. This is because the inventors have found that, as shown in FIG. 2, if the x value in $Li_xFe_2(SO_4)_3$ exceeds 2 the potential decreases rapidly, and also that in this region of low potential the basic structure of $Li_xFe_2(SO_4)_3$ breaks down and metallic iron separates out. This results in a marked lowering in discharge capacity even with recharging, and a subsequent loss in reversibility.

Furthermore, the value of x is preferably large providing it is no greater than 2, with a value of 2 being the most favourable. The larger the value of x the greater the amount of lithium incorporated in the positive electrode, and consequently the greater the amount of lithium which can be supplied to the negative electrode, giving an improvement in capacity characteristics and a longer cycle life.

The $Li_xFe_2(SO_4)_3$ can be obtained by chemical reaction between lithium metal or a lithium compound, and $Fe_2(SO_4)_3$ or a precursor which gives rise to $Fe_2(SO_4)_3$. For example, it can be obtained by reaction of lithium metal or lithium compounds such as n-butyl lithium, or lithium napthylide, with iron sulfate in a solvent, and subsequent removal of the solvent and any unreacted materials.

In order to produce $Li_xFe_2(SO_4)_3$ using a lithium compound, a compound with stronger reducing properties than $Fe_2(SO_4)_3$ must be chosen. More specifically, incorporation of lithium into $Fe_2(SO_4)_3$ requires reduction of the ferric ion, and in order to achieve that, the lithium compound must have a redox potential lower than that of $Fe_2(SO_4)_3$. Consequently, since the redox potential of $Fe_2(SO_4)_3$ relative to a lithium electrode is 3.6 volts, lithium compounds which display redox potentials of less than 3.6 volts relative to a lithium electrode can be used.

As metallic lithium has a redox potential of 0 volts relative to a lithium electrode, it meets the criterion of being less than 3.6 volts.

Furthermore, although $Li_xFe_2(SO_4)_3$ ($0<x\leq2$) can be produced inside the battery by electrochemical reaction, it is far simpler, and far more valuable from an industrial viewpoint, to synthesize $Li_xFe_2(SO_4)_3$ ($0<x\leq2$) directly by chemical reaction using a lithium compound which has a redox potential relative to a lithium electrode of less than 3.6 volts.

Furthermore, in the chemical synthesis of $Li_xFe_2(SO_4)_3$, in order to restrict the value of x to 2 or less, the quantities of metallic lithium or lithium compound, and of the $Fe_2(SO_4)_3$ or its precursor are controlled so that the lithium/iron ratio is no greater than 1.

If the reaction rate is slow it is necessary to ensure an adequate reaction time. This is because if the reaction time is insufficient, the x value in $Li_xFe_2(SO_4)_3$ drops markedly, producing a decrease in the amount of lithium which can be subsequently supplied to the negative electrode.

It should be noted however that if reaction is carried out between different substances, then the individual reactions will not necessarily proceed at equal rates, meaning that even if reaction quantities are controlled, a possibility exists that for some portions of the mixture the lithium/iron ratio may exceed 1, and the x value in $Li_xFe_2(SO_4)_3$ may thus exceed 2, resulting in a loss of basic structure.

As a result of research by the inventors, it has been found that this problem can be resolved by using lithium compounds which display redox potentials relative to a lithium electrode of between 1.5 and 3.6 volts. The suggested reasons for this observation are outlined below. As shown in FIG. 2, $Li_xFe_2(SO_4)_3$ displays the property that when the x value exceeds 2, the potential relative to a lithium electrode drops to less than 1.5 volts. Consequently, when $Li_2Fe_2$ $(SO_4)_3$ is generated by reaction of a lithium compound having a potential relative to a lithium electrode of 1.5 volts or greater, with either $Fe_2(SO_4)_3$ or its precursor, then if the lithium content increases even slightly, the potential of $Li_2Fe_2(SO_4)_3$ drops to less than 1.5 volts, and the lithium compound, which has a potential relative to a lithium electrode of greater than 1.5 volts, is no longer able to supply electrons to $Li_2Fe_2(SO_4)_3$. As a result, the lithiation reaction stops, and $Li_2Fe_2(SO_4)_3$ is obtained with the x value not going above 2.

In this manner, by using above specified specific lithium compounds, even if more lithium than iron is used in the reaction system, the value of x in $Li_xFe_2(SO_4)_3$ will not exceed 2. Consequently, the amount of lithium compounds used for reaction with a certain amount of $Fe_2(SO_4)_3$ does not need to be measured to a high level of accuracy, making the synthesis of $Li_2Fe_2(SO_4)_3$ simple. Moreover, adding excess lithium compound to increase the reactivity of the reaction system, still results in an x value of 2, thus offering a method for increasing the reaction rate.

Examples of lithium compounds which display potentials relative to a lithium electrode of between 1.5 and 3.6 volts include LiI(lithium iodide), $Li_2CuO_2$, and $Li_2Mn_2O_4$. Of these compounds, lithium iodide is particularly suitable, as it offers the advantage of being comparatively more soluble in solvent, so that even if excess is added to the reaction system, its subsequent removal is straightforward. Furthermore, the iodine $(I_2)$ produced after the insertion of lithium into either $Fe_2(SO_4)_3$ or its precursor is also comparatively soluble in solvent, making its subsequent removal also straightforward.

The positive electrode material outlined above can be easily applied to use as the positive electrode in lithium batteries. Examples include, a method whereby a mixture of this type of positive electrode material and a powdered binder such as polytetrafluoroethylene is pressure bonded to a support body such as stainless steel; a method whereby in order to give conductivity to the mixture a further addition of a conductive powder such as acetylene black is made (further binder may be added as required), and this mixture then placed inside a metallic container or pressure bonded to a support body such as stainless steel; and a method whereby a mixture of the positive electrode material and binder (with conductive agent added as required) is converted to a slurry by dispersion in a suitable solvent such as an organic solvent, and then applied to a metallic substrate.

There are no particular limitations on the electrolyte liquid, providing it is a substance which allows the movement of lithium ions for electrochemical reaction at the positive and negative electrodes, and as such, solutions of a lithium salt with ion dissociation properties in an anhydrous solvent are appropriate.

Suitable examples include anhydrous electrolytic solutions or solid electrolytes formed from the dissolution of Lewis acids such as $LiAsF_6$, $LiBF_4$, $LiPF_6$, $LiAlCl_4$, or $LiClO_4$ in an organic solvent such as dimethoxyethane, diethoxyethane, 2-methyltetrahydrofuran, ethylene carbonate, propylene carbonate, methyl formate, dimethyl sulfoxide, acetonitrile, butyrolactone, dimethyl formamide, dimethyl carbonate, diethyl carbonate, sulfolane, or ethyl methyl carbonate. Furthermore, if required, mixtures of these solutions can also be used.

For the negative electrode, metallic lithium or lithium compounds are used. An example of a suitable lithium compound is lithium aluminum metal alloy.

In order to use this type of material as the negative electrode, the material can be produced in sheet form, and this sheet then pressure bonded to a conductive mesh of nickel or stainless steel.

For lithium batteries containing a negative electrode formed in this way, from either metallic lithium or a lithium compound, and a positive electrode of the present invention, lithium is supplied by the positive electrode, and consequently, the total quantity of lithium in the battery is large, and the cycle life is long.

Furthermore, the use of an active material retainer, which is capable of lithium insertion and extraction and in which extraction capable lithium has not previously been retained, as the negative electrode is also possible. This means that positive electrodes of the present invention, because they supply lithium to the negative electrode, can be used to produce particularly long life lithium ion batteries which have excellent properties, but because they do not contain expensive metals like cobalt, are still cheap.

Examples of active material retainers which are capable of lithium insertion and extraction include carbonaceous materials, $Li_4Ti_5O_{12}(Li_{4/3}Ti_{5/3}O_4)$, and $WO_2$. Of these, the use of carbonaceous materials is most suitable as it produces a marked improvement in cycle properties.

Examples of carbonaceous material include graphite, hard carbon, and soft carbon.

Production of the negative electrode from these types of materials can be carried out using methods such as pressure bonding or application, in the same manner as described for the positive electrode.

Lithium batteries of the present invention are not limited to certain varieties of battery or specific battery shapes, and can be applied to a variety of battery types including coin shaped, cylindrically shaped, angular shaped, and button shaped batteries.

Furthermore, typical, existing materials can be used for the various other necessary components of the battery such as separators and battery cases, with there being no specific restrictions.

With lithium batteries of the present invention, charging can be carried out by application of a voltage of, for example, 3.9 volts to the negative electrode of the battery, causing lithium to be extracted from the $Li_xFe_2(SO_4)_3$ of the positive electrode, and then adhere to, or be inserted into, the negative electrode. The charged battery thus formed generates a potential of approximately 3.6 volts between the positive and negative electrodes, so that when some form of electrical load such as a resistor, is connected to the positive and negative electrodes, a current flows, causing the battery to discharge.

The present invention is explained in more specific terms below, in relation to actual embodiments, but it should be noted that the present invention is in no way limited to the embodiments presented. In all of the embodiments, battery production and measurements were carried out in a dry box, under an atmosphere of argon.

[EXAMPLE 1]

Figure 1:
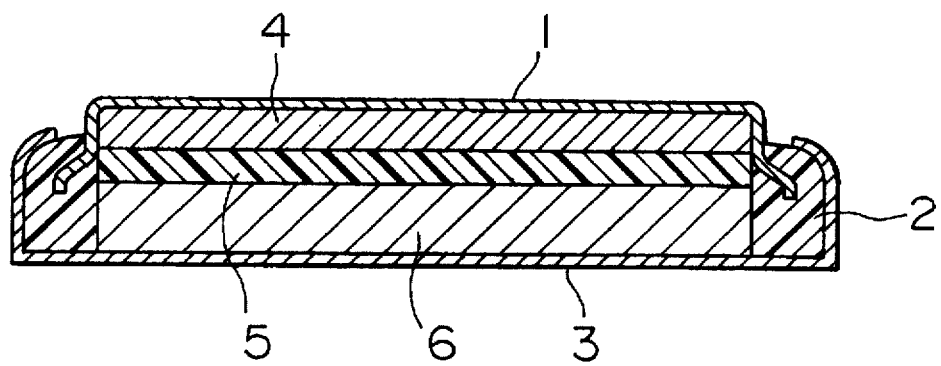
FIG. 1 is a cross-sectional view of a coin shaped battery according to the embodiments.

FIG. 1 shows a coin shaped lithium battery being a first example of a battery according to the present invention. In brief, this lithium battery is constructed from a positive electrode case 3, in which is arranged a pellet of a positive electrode mixture 6 which contains $Li_2Fe_2(SO_4)_3$, a negative electrode 4 which contains metallic lithium, an intervening micro-porous separator 5 made of polypropylene, and a stainless steel sealing cover 1 which sits on top of the negative electrode 4, and is sealed with a gasket 2 of polypropylene. The negative electrode 4, the separator 5, and the pellet of positive electrode mixture 6 are all impregnated with electrolyte solution. The electrolyte solution maintains the ion conductivity between the pellet of the positive electrode mixture 6 and the negative electrode 4, and is a number 1 normal solution of $LiPF_6$ dissolved in an equal volume mixture of ethylene carbonate and dimethyl carbonate.

The lithium battery shown in the figure is a coin type battery of thickness 2 mm and diameter 23 mm, with a round disc shaped negative electrode 4 of thickness 0.07 mm and diameter 18 mm, and a pellet of positive electrode mixture 6 of thickness 0.5 mm and diameter 15 mm.

Assembly of lithium batteries of this construction is carried out by first pressure bonding the metallic lithium of the negative electrode 4 to the upturned sealer cover 1 and then fitting the cover 1 into the gasket 2. The separator 5 and the pellet of positive electrode mixture 6 are then placed on top of the negative electrode 4, and the whole assembly impregnated with electrolyte solution, and finally covered with the positive electrode case 3.

The pellet of positive electrode mixture 6 was produced as follows.

First, $Fe_2(SO_4)_3$ was produced by heating $(NH_4)_2Fe_2(SO_4)_2.6H_2O$ under atmospheric conditions for 5 hours at 480° C. Next, this $Fe_2(SO_4)_3$ was mixed with lithium iodide, to give a mixture with a lithium/iron ratio of 2, and the mixture heated for 5 hours at 82° C. in acetonitrile. The powder thus obtained was washed with acetonitrile to remove the excess lithium iodide, to give $Li_2Fe_2(SO_4)_3$ (herein referred to as positive electrode material a).

The $Li_2Fe_2(SO_4)_3$ was then ground up to give a powder, mixed with a conductive agent (acetylene black) and a binder (polytetrafluoroethylene), and then roll formed to produce the pellets of positive electrode mixture 6.

[EXAMPLE 2]

The battery of this embodiment (second example) is the same as that of the first example, with the exception of the positive electrode, which uses positive electrode material produced by the method described below.

First, $Fe_2(SO_4)_3$ was produced by reacting $FeSO_4.7H_2O$ with hydrogen peroxide in concentrated sulfuric acid. Next, this $Fe_2(SO_4)_3$ was mixed with lithium iodide LiI, to give a lithium/iron ratio of 2, and the mixture heated for 5 hours at 82° C. in acetonitrile. The powder thus obtained was then washed with acetonitrile to remove the excess lithium iodide, to give $Li_{1.9}Fe_2(SO_4)_3$ (positive electrode material b).

[EXAMPLE 3]

The battery of this embodiment (third example) is the same as that of the first example, with the exception of the positive electrode, which uses positive electrode material produced by the method described below.

First, $FeSO_4.7H_2O$ was placed in a flask fitted with a reflux condenser, concentrated sulfuric acid added, and the mixture refluxed under heat for 5 hours to give $Fe_2(SO_4)_3$. Next, this $Fe_2(SO_4)_3$ was mixed with lithium iodide LiI, to give a lithium/iron ratio of 2, and the mixture heated for 5 hours at 82° C. in acetonitrile. The powder thus obtained was then washed with acetonitrile to remove the excess lithium iodide, to give $Li_{1.8}Fe_2(SO_4)_3$ (positive electrode material c).

[EXAMPLE 4]

The battery of this embodiment (fourth example) is the same as that of the first example, with the exception of the positive electrode, which uses positive electrode material produced by the method described below.

First, $Fe_2(SO_4)_3$ was produced by heating $(NH_4)_2Fe_2(SO_4)_2.6H_2O$ under atmospheric conditions for 5 hours at 480° C. Next, this $Fe_2(SO_4)_3$ was mixed with lithium iodide LiI, to give a lithium/iron ratio of 1, and the mixture heated for 5 hours at 82° C. in acetonitrile. The powder thus obtained was then washed with acetonitrile to remove the excess lithium iodide, to give $Li_{1.6}Fe_2(SO_4)_3$ (positive electrode material d).

[EXAMPLE 5]

The battery of this embodiment (fifth example) is the same as that of the first example, with the exception of the negative electrode, for which a carbonaceous material capable of lithium insertion and extraction was used. The negative electrode was produced by mixing the powdered carbonaceous material with a fluorocarbon resin binder, and suspending the mixture in Methylpyrrolidone to give a paste, which was then applied to copper foil, dried and then rolled.

[Test 1]

The batteries of the four examples above, were charged to a voltage of 4.5 volts at a current density of 0.5 mA/cm$^2$, and then their discharge capacities measured by discharging the batteries until a voltage of 2.5 volts was reached.

In addition, the batteries were subjected to repeated charge-discharge cycles over this 2.5–4.5 volts range, at a charge-discharge current density of 0.5 mA/cm$^2$, and their discharge capacities remeasured on the 10th discharge cycle. The measurements are shown in Table 1.

As a comparison, a lithium battery (control example 1) which, with the exception of the positive electrode which uses positive electrode material (positive electrode material e) produced by the method described below, was the same as the battery of the first example, was also charged to a voltage of 4.5 volts at a current density of 0.5 mA/cm$^2$, and its discharge capacity measured by discharging until a voltage of 2.5 volts was reached. Similarly, its discharge capacity following 10 charge-discharge cycles was also measured.

First, $Fe_2(SO_4)_3$ was produced by heating $(NH_4)_2Fe_2(SO_4)_2.6H_2O$ under atmospheric conditions for 5 hours at 480° C. Next, this $Fe_2(SO_4)_3$ was combined with n-butyl lithium (which has a redox potential relative to a lithium electrode of less than 1.5 volts), to give a lithium/iron ratio of 2, and the mixture reacted in hexane for a period of one week. The powder thus obtained was then washed with hexane to remove the excess n-butyl lithium, to give a powdered product (positive electrode material e).

Analysis of this powder by X-ray diffraction resulted in the observation of peaks for metallic iron and lithium sulfate $Li_2SO_4$, indicating that the basic structure of $Li_xFe_2(SO_4)_3$ had broken down.

TABLE 1

| Positive electrode material | Initial discharge capacity | Discharge capacity following 10 charge-discharge cycles |
|---|---|---|
| Example 1 a | 13.4 (mAh) | 13.2 (mAh) |
| Example 2 b | 12.5 (mAh) | 12.2 (mAh) |
| Example 3 c | 12.2 (mAh) | 12.1 (mAh) |

TABLE 1-continued

| | Positive electrode material | Initial discharge capacity | Discharge capacity following 10 charge-discharge cycles |
|---|---|---|---|
| Example 4 | d | 10.3 (mAh) | 10.2 (mAh) |
| Control example 1 | e | 2.1 (mAh) | — |

As can be seen from Table 1, whereas the discharge capacity of the control example 1 is small, and furthermore disappears altogether following 10 charge-discharge cycles, the lithium batteries of examples 1–4 all display high discharge capacities, as well as only minimal lowering of these discharge capacities on repeated charging and discharging.

Furthermore, the x value in $Li_xFe_2(SO_4)_3$ was closest to 2 in the examples 1 through 3, wherein excess lithium iodide was added during the synthesis of the positive electrode material, and these examples display particularly high discharge capacities and small reductions in discharge capacity upon continued charging and discharging.

Figure 3:
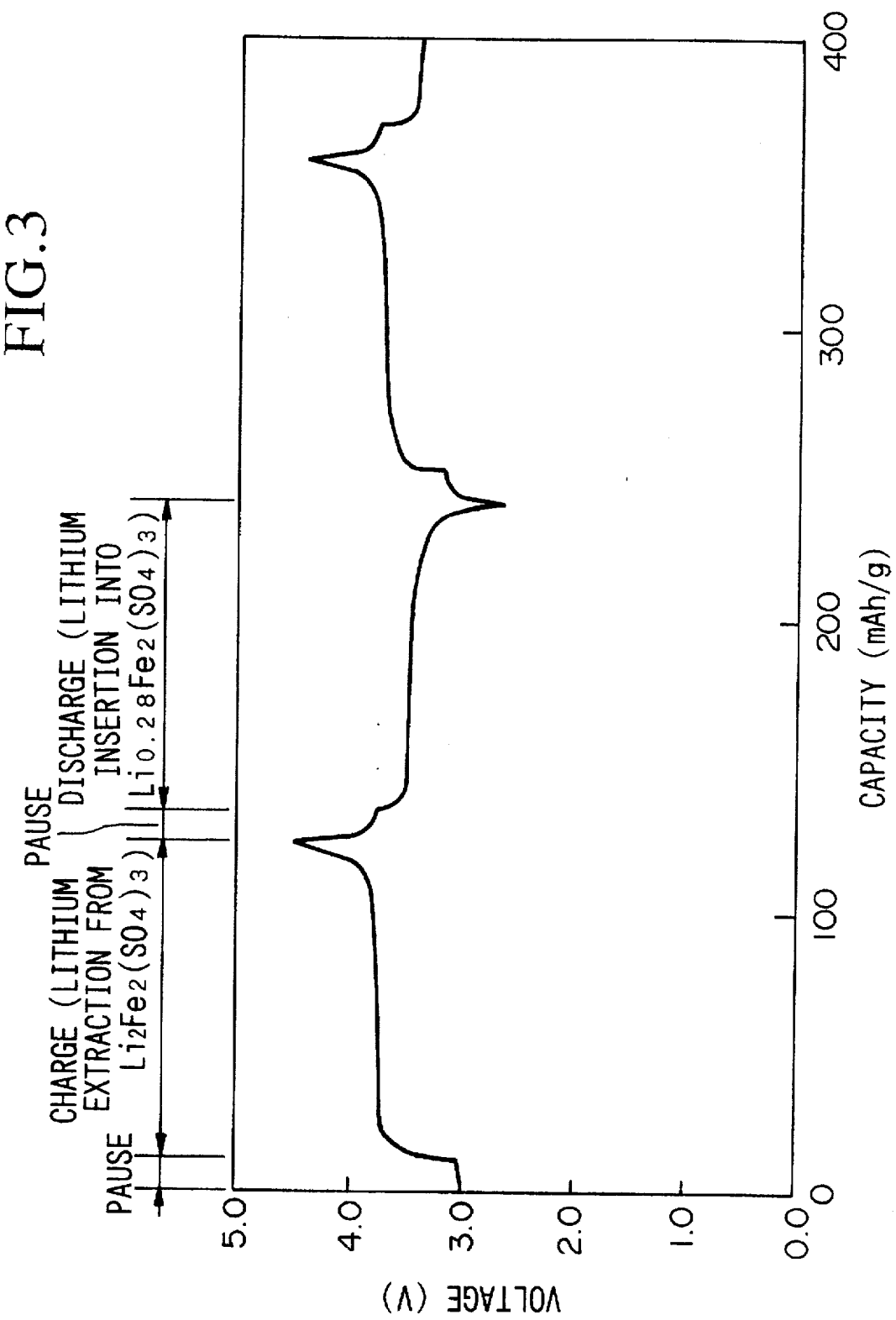
FIG. 3 is a graph showing voltage characteristics relative to specific capacity for a battery of a first embodiment.

FIG. 3 shows the voltage characteristics of the lithium battery of example 1 in terms of the specific capacity per gram of positive electrode material. As is shown in FIG. 3, the lithium battery of example 1 displays recharge cycle characteristics which are as good as those of batteries employing $LiCoO_2$.

[Test 2]

Using the lithium batteries from examples 1 and 5, the charge-discharge cycles were continued, at the same 2.5–4.5 volts range and charge-discharge current density of 0.5 mA/cm², to test the change in discharge capacity.

Furthermore, for the purposes of comparison, a lithium battery (control example 2) which, with the exception of the positive electrode, which uses $Fe_2(SO_4)_3$ synthesized by heating $(NH_4)_2Fe_2(SO_4)_2.6H_2O$ under atmospheric conditions for 5 hours at 480° C., was the same as the battery of the first example, was also tested for change in discharge capacity, by employing the same charge-discharge cycles, with a 2.5–4.5 volts range and a charge-discharge current density of 0.5 mA/cm².

In the case of the battery of the control example 2, the initial discharge capacity was 12.0 mAh, and the capacity was maintained at approximately this level for 35 charge-discharge cycles, but beyond that the capacity dropped rapidly, and by the 39th cycle the discharge capacity had fallen to half the initial value.

Disassembly of the battery of the control example 2 revealed that the lithium of the negative electrode had lost its luster, and that the drop in discharge capacity was due to a depletion in the amount of lithium available for charging and discharging.

In contrast, the discharge capacity of the lithium battery of example 1 was maintained at approximately the initial discharge capacity level for 50 charge-discharge cycles, but beyond that the capacity dropped rapidly, and by the 55th cycle the discharge capacity had fallen to half the initial value. As such, the battery of example 1 displays a long cycle life. This is because, unlike the battery of the control example 2, the battery of example 1 is able to utilize the lithium from the positive electrode, meaning there is a greater total amount of lithium available for charging and discharging.

Disassembly of the battery of example 1 revealed that the lithium of the negative electrode had lost its luster, and that the drop in discharge capacity was due to a depletion in the amount of lithium available for charging and discharging.

Furthermore, in the case of the battery of example 5, the discharge capacity was maintained at approximately the initial discharge capacity level, even after 100 charge-discharge cycles. As such, the lithium battery of example 5 displays good rechargeability and an extremely long cycle life.

In the above examples, examples are given of the production of lithium batteries, where the compound represented by the formula $Li_xFe_2(SO_4)_3$ (0<x≦2) is synthesized by particular synthetic methods, and then used as the positive electrode. However needless to say, lithium batteries where the positive electrode utilizes the same compound $Li_xFe_2(SO_4)_3$ (0<x≦2) which has been synthesized by alternative methods, will yield the same results.

What is claimed is:

1. A lithium battery comprising: a positive electrode, a negative electrode, and an electrolyte, wherein the positive electrode comprises $Li_xFe_2(SO_4)_3$ (0<x≦2) obtained by reacting a lithium compound which has a redox potential relative to a lithium electrode of between 1.5 and 3.6 volts, and $Fe_2(SO_4)_3$, or a precursor which gives rise to $Fe_2(SO_4)_3$.

2. The lithium battery as claimed in claim 1, wherein the lithium compound comprises lithium iodide.

3. The lithium battery as claimed in claim 1, wherein the precursor comprises $(NH_4)_2Fe_2(SO_4)_2.6H_2O$ or $FeSO_4.7H_2O$.

4. The lithium battery as claimed in claim 1, wherein the negative electrode comprises a lithium insertion and extraction capable active material retainer, and the electrolyte comprises a substance that allows movement of lithium ions for electrochemical reactions at the positive and negative electrodes.

5. The lithium battery as claimed in claim 4, wherein the active material retainer comprises a carbonaceous material.

6. The lithium battery as claimed in claim 1, wherein the negative electrode comprises lithium or a lithium compound, and the electrolyte comprises a substance which allows movement of lithium ions for electrochemical reactions at the positive and negative electrodes.

7. A method of producing a positive electrode material for use in lithium batteries comprising the step of:

reacting a lithium compound and $Fe_2(SO_4)_3$, or a precursor which gives rise to $Fe_2(SO_4)_3$, to produce a compound represented by the chemical formula $Li_xFe_2(SO_4)_3$ (0<x≦2), wherein the lithium compound has a redox potential relative to a lithium electrode of between 1.5 and 3.6 volts.

8. The method as claimed in claim 7, wherein a sufficient amount of the lithium compound is added to make the proportion of Li with respect to Fe greater than 1.

9. The method as claimed in claim 7, wherein the lithium compound comprises lithium iodide.

10. The method as claimed in claim 7, wherein the precursor comprises $(NH_4)_2Fe_2(SO_4)_2.6H_2O$ or $FeSO_4.7H_2O$.

* * * * *